United States Patent
Borne et al.

(10) Patent No.: US 7,292,908 B2
(45) Date of Patent: Nov. 6, 2007

(54) SYSTEMS AND METHODS FOR MANUFACTURING CUSTOMIZED PREFABRICATED BUILDINGS INCLUDING ARBITRARILY MODULARIZING A BUILDING SPECIFICATION WITHOUT USING ANY PRE-DEFINED MODULES

(75) Inventors: Stuart B. Borne, Avon, CO (US); Cory Clarke, Brooklyn, NY (US); Jon E. Becker, Avon, CO (US)

(73) Assignee: Robotic Built Structures, Inc., Irvine, CA (US)

( * ) Notice: Subject to any disclaimer, the term of this patent is extended or adjusted under 35 U.S.C. 154(b) by 360 days.

(21) Appl. No.: 10/965,407

(22) Filed: Oct. 13, 2004

(65) Prior Publication Data

US 2006/0075718 A1    Apr. 13, 2006

(51) Int. Cl.
G06F 19/00 (2006.01)
G06F 17/00 (2006.01)
E04B 1/00 (2006.01)

(52) U.S. Cl. .......................... 700/182; 700/173; 703/1; 52/745.19

(58) Field of Classification Search ................ 700/182, 700/173; 703/1; 52/745.19
See application file for complete search history.

(56) References Cited

U.S. PATENT DOCUMENTS

| | | |
|---|---|---|
| 4,275,449 A | 6/1981 | Aish |
| 4,849,913 A | 7/1989 | Ward et al. |
| 5,936,863 A * | 8/1999 | Kostelnik et al. ............ 700/171 |
| 6,272,447 B1 | 8/2001 | Gavin et al. |
| 6,561,238 B2 | 5/2003 | Knighten |
| 6,757,643 B2 | 6/2004 | Gavin et al. |
| 6,775,581 B2 | 8/2004 | Landers et al. |
| 6,816,819 B1 | 11/2004 | Loveland |
| 6,826,516 B1 | 11/2004 | Ito |
| 2002/0007605 A1 | 1/2002 | Cohen et al. |
| 2002/0010522 A1 | 1/2002 | Martin |
| 2002/0099460 A1 | 7/2002 | Bowler et al. |

(Continued)

OTHER PUBLICATIONS

Carlos Balaguer, et al. "FutureHome: An Integrated Construction Automation Approach". IEEE Robotics & Automation Magazine (Mar. 2002): 55-66.*

(Continued)

*Primary Examiner*—Ryan A Jarrett
(74) *Attorney, Agent, or Firm*—Orrick, Herrington & Sutcliffe LLP

(57) ABSTRACT

Systems and methods for designing and manufacturing customized prefabricated buildings in optimized modules. In one embodiment, a system for manufacturing a customized prefabricated building includes a computer-usable medium having a sequence of instructions which, when executed by a processor, causes said processor to execute a process including receiving a specification for a customized prefabricated building that identifies components for the prefabricated building and the dimensions of the components, modularizing the specification into modules meeting overall length, width, and height limitations, and optimizing the modularization; a programmable manufacturing system controller coupled to the computer-usable medium and configured to generate instructions for manufacturing the said optimized modules having the plurality of components identified in the specification received by the computer-usable medium; and a manufacturing system coupled to the programmable manufacturing controller configured to execute the instructions generated by the programmable manufacturing controller for building the said optimized modules having the specified plurality of components.

41 Claims, 12 Drawing Sheets

U.S. PATENT DOCUMENTS

2002/0183983 A1  12/2002  Ehrlich et al.
2004/0073410 A1  4/2004   Maly et al.
2004/0083017 A1  4/2004   Brown et al.
2004/0138772 A1  7/2004   Barman et al.
2004/0186697 A1  9/2004   Schreier et al.
2004/0225391 A1  11/2004  Fromherz et al.

OTHER PUBLICATIONS

R. Diez, M. Abderrahim, V.M. Padron, J.M. Pastor, C. Balaguer. "Autmod3: an automatic 3D modularization system". Proceedings from the 17th International Symposium on Automation and Robotics in Construction ISARC'00, Taiepei, Taiwan (2000): 1033-1038.*

* cited by examiner

SYSTEMS AND METHODS FOR MANUFACTURING CUSTOMIZED PREFABRICATED BUILDINGS INCLUDING ARBITRARILY MODULARIZING A BUILDING SPECIFICATION WITHOUT USING ANY PRE-DEFINED MODULES

FIELD OF THE INVENTION

The field of the invention generally relates to the design, manufacture, and construction of buildings, and more particularly to systems and methods for manufacturing customized prefabricated buildings.

BACKGROUND OF THE INVENTION

Prefabricated buildings, such as commercial structures and residential homes, have become a popular alternative to "built-on-site" buildings. Prefabricated buildings include manufactured buildings, wherein the building is built in a factory setting, and prefabricated buildings, wherein the components of the building are prefabricated and precut in a factory setting. Companies, such as Fleetwood Enterprises, Inc., have factories organized in an assembly line fashion to build the individual components for a prefabricated home, such as the panels and the framework. The components are precut at the factory and shipped via truck to the site of the home for assembly.

One significant drawback to existing prefabricated building systems is that existing systems are only able to accommodate a single design or single model without having to significantly change the assembly line(s), which can be very expensive. Thus, consumers who desire to invest in prefabricated homes are only provided with a limited number of design options set by the manufacturers and lack the ability to select their own custom, or mixed-model, designs.

Another significant drawback to existing prefabricated building systems is that they require a significant amount of manual labor in the fabrication process, resulting in high fabrication costs per square foot.

Yet another significant drawback is that in order to ship the buildings, the buildings must be split into appropriate sized "modules" to fit on the back of a truck and fit within the typical dimensions of a highway lane. In order to create appropriate sized modules for shipping, a building is typically "forward engineered" in parts, wherein each part is designed to fit within the maximum allowable shipping limits, or envelope. In other words, consideration of the size and the dimensions of the shipping modules may override those of the consumer's desires in the design of the building. This may place undesirable limitations on the design of the building.

There are companies that offer "system-built" homes, such as those offered by All American Homes, which allow a user to create a custom design for a home using model rendering software, such as Chief Architect® or 3D Studio Viz®, and then build the home in a manufacturing facility. However, the manufacturing facilities used by these companies require a substantial amount of manual labor, again, resulting in high fabrication costs per square foot.

Accordingly, an improved system and method for manufacturing prefabricated building would be desirable.

SUMMARY OF THE INVENTION

The present invention generally relates to the design, manufacture, and construction of buildings, and more particularly to systems and methods for manufacturing customized prefabricated buildings. In one embodiment, a system for manufacturing a customized prefabricated building includes a computer-usable medium having a sequence of instructions which, when executed by a processor, causes said processor to execute a process including receiving a specification for a customized prefabricated building that identifies components for the prefabricated building and the dimensions of the components, modularizing the specification into modules meeting overall length, width, and height limitations, and optimizing the modularization; a programmable manufacturing system controller coupled to the computer-usable medium and configured to generate instructions for manufacturing the said optimized modules having the plurality of components identified in the specification received by the computer-usable medium; and a manufacturing system coupled to the programmable manufacturing controller configured to execute the instructions generated by the programmable manufacturing controller for building the said optimized modules having the specified plurality of components.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

DETAILED DESCRIPTION OF THE PREFERRED EMBODIMENTS

Figure 1:
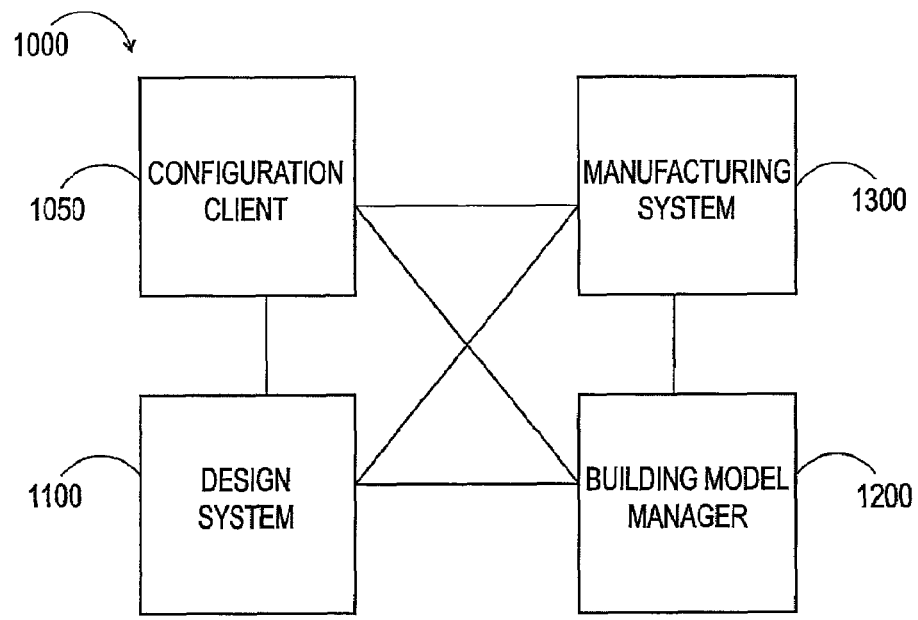
FIG. 1 is a diagram of a preferred embodiment of the present invention.

Described below are systems and methods for manufacturing prefabricated buildings. One such system 1000 is shown in FIG. 1. The system 1000 includes a Configuration Client 1050, a Design System 1100, building model manager 1200, and a manufacturing system 1300. These components are all configured to communicate with one another. The system 1000 and its components 1050/1100/1200/1300 may be implemented with one or more computers networked together, on a local area network, a wide area network, and/or the Internet. Generally, the Configuration Client 1050 includes components that are used to directly interface with a user, such as a customer or client, and may include lead generation and sales tools as well as web-site and client based design tools. The Design System 1100 includes software for generating a building design and generating the details of the design and may include a user interface for architects and designers. The building model manager 1200 includes software that provide the infrastructure for communication between the different components 1050/1200/1300 of the system 1000 and storage of building design data. The manufacturing system 1300 includes software components for managing inventory and time resources for manufacturing as well as software used for controlling machine tools, such as computerized numerically controlled ("CNC") machining equipment, and a plurality of assembly lines. CNC generally refers to the computer control of machine tools for the purpose of manufacturing complex parts in metal, wood, and other materials, using a notation known in the art as "G-code", or "CNC code."

Figure 2A:
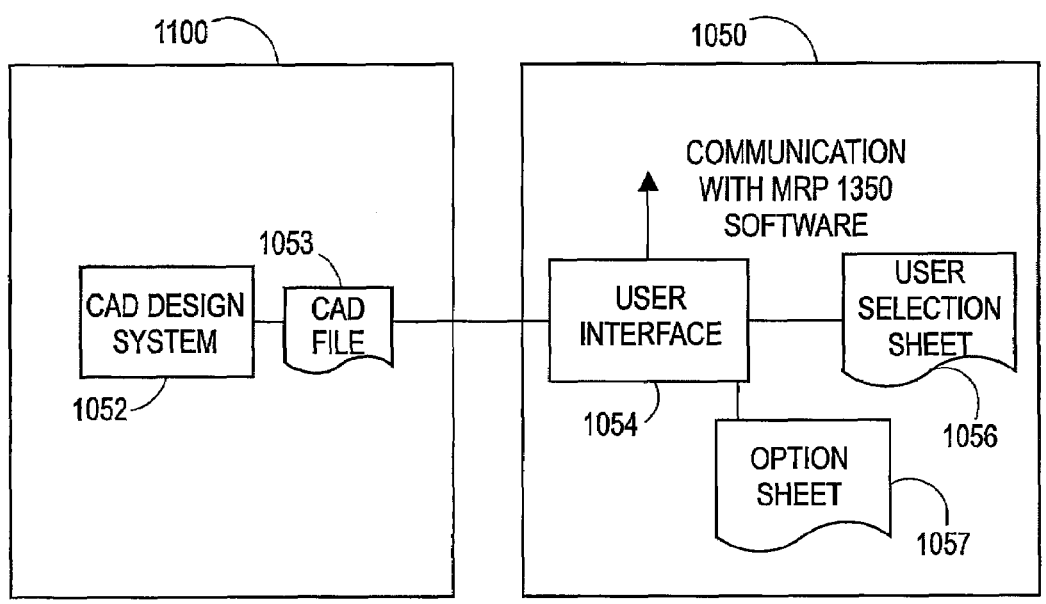
FIG. 2a is a diagram of the user interface of a preferred embodiment of the present invention.

As mentioned above, both the Configuration Client 1050 and the Design System 1100 include user interfaces. The user interface for the Configuration Client is generally used by a customer or client, whereas the user interface for the Design System 1100 is generally used by an architect, engineer, or designer. Turning to FIG. 2a, an implementation of the Configuration Client 1050 and a user interface for the Design System 1100 is shown. The user interface of the Design System 1100 may be implemented as a computer aided drafting ("CAD") program or design system 1052, such as AutoCAD®, which enables an architect, designer, or engineer to create one or more designs for custom prefabricated homes. The CAD design system 1052 generates a CAD file 1053, which contains the design in the form of objects with building blocks of points and edges. For programs such as AutoCAD®, these CAD files 1053 are known as DXF files.

As mentioned above, the Configuration Client 1050 also includes a User Interface 1054, generally for a customer or a client. The User Interface 1054 reads the CAD file 1053 and then creates a viewable model based on data from the CAD file 1053. The model may be 2D or 3D. The User Interface 1054 is used by an architect/engineer/designer to create an option sheet 1057, which is a file or database record that contains all the options that a user may select from in deciding the design and features of a prefabricated home, such as the geometry, dimensions, features, fixtures, windows, materials, floors, etc. The User Interface 1054 further includes a graphical user interface ("GUI") for a user to select its desired design and features for a prefabricated building. The User Interface 1054 may present the options from the options sheet 1057 to the user for selection within the GUI. The User Interface 1054 may incorporate the user's selection into the model for the user's review. The User Interface 1054 may further allow a user to move window and door openings and to customize the interior space. In one preferred embodiment, the User Interface 1054 may be accessible over the Internet, and the GUI is provided as an active web page.

The user's selection of the options may be saved in a user selection sheet 1056, which is also a file or database record(s). These options may be used to generate a building specification file 1215 stored in the building model database 1210 of the building model manager 1200, described below and shown in FIG. 6. As will be described below, the user selection sheet 1056 may be combined with the building specification file 1215 and read by the 3D modeling software to generate a full 3D model of the design for architectural review and generation of CNC code.

In one implementation, an Internet based sales tool called Systemacasa™ may be used to allow users to select their options and further may be used to provide the 3D modeling.

Figure 7:
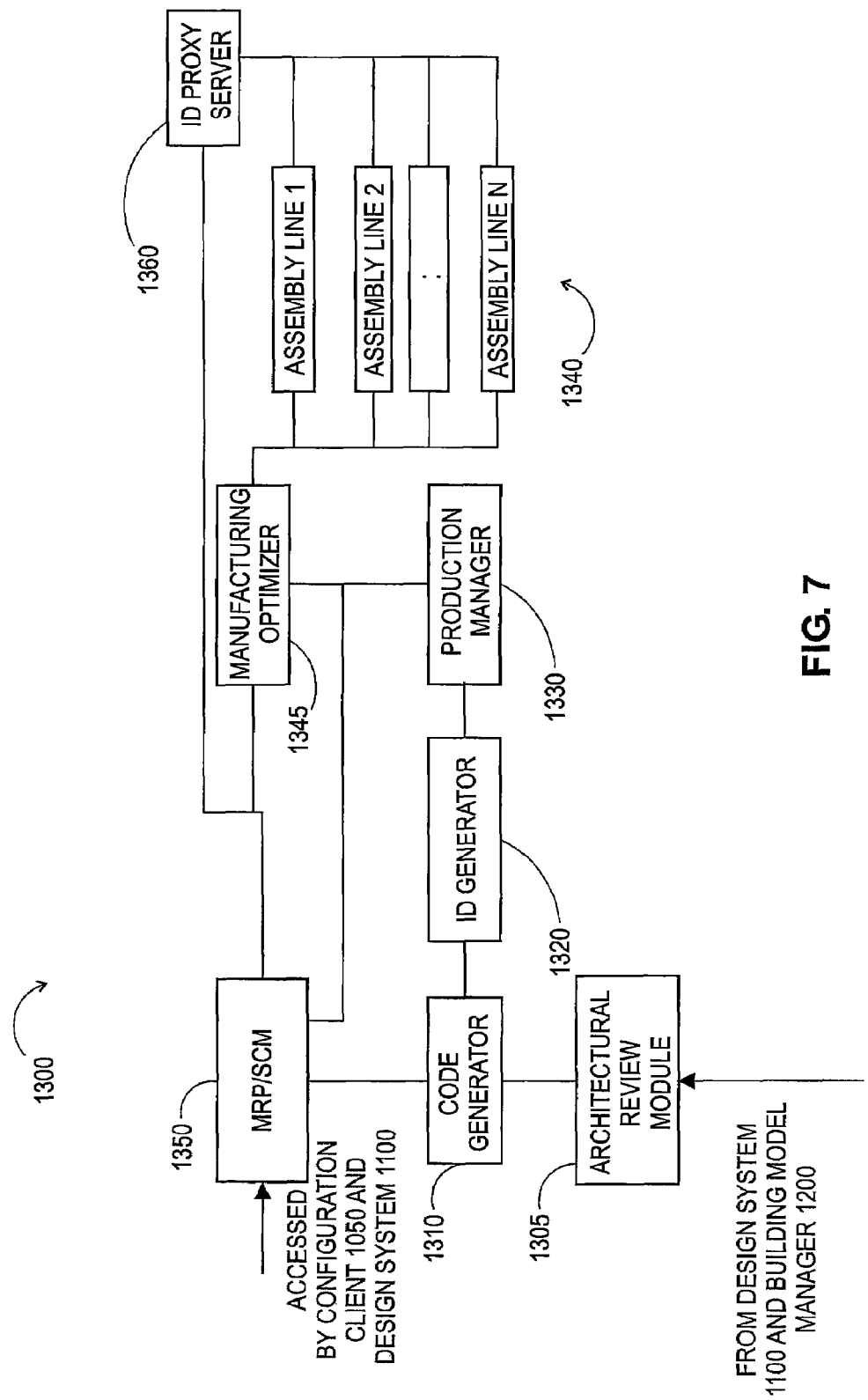
FIG. 7 is a diagram of a manufacturing system in accordance with a preferred embodiment of the present invention.

The User Interface 1054 may be coupled to a manufacturing resource planner ("MRP") 1350, which may be located in the manufacturing system 1300 and is described in more detail below and is shown in FIG. 7. The MRP 1350 manages the inventory for building components and costing and may also function as a clearing-building and authorizing agent for all manufacturing operations. Thus, after the user selects options and a design for a building, the user may receive approximate cost for the design and options as well as shipping date in a short time after the user's selection is made. Further, from user's selection, the User Interface 1054 may calculate estimated energy costs on heating/cooling a building assembled from the design based on design aspects, such as cubic volume of design and selected fixtures, e.g., solar-panel roofing and energy efficient light fixtures, and the location (of the site) aspects, such as average historical temperatures.

Figure 2B:
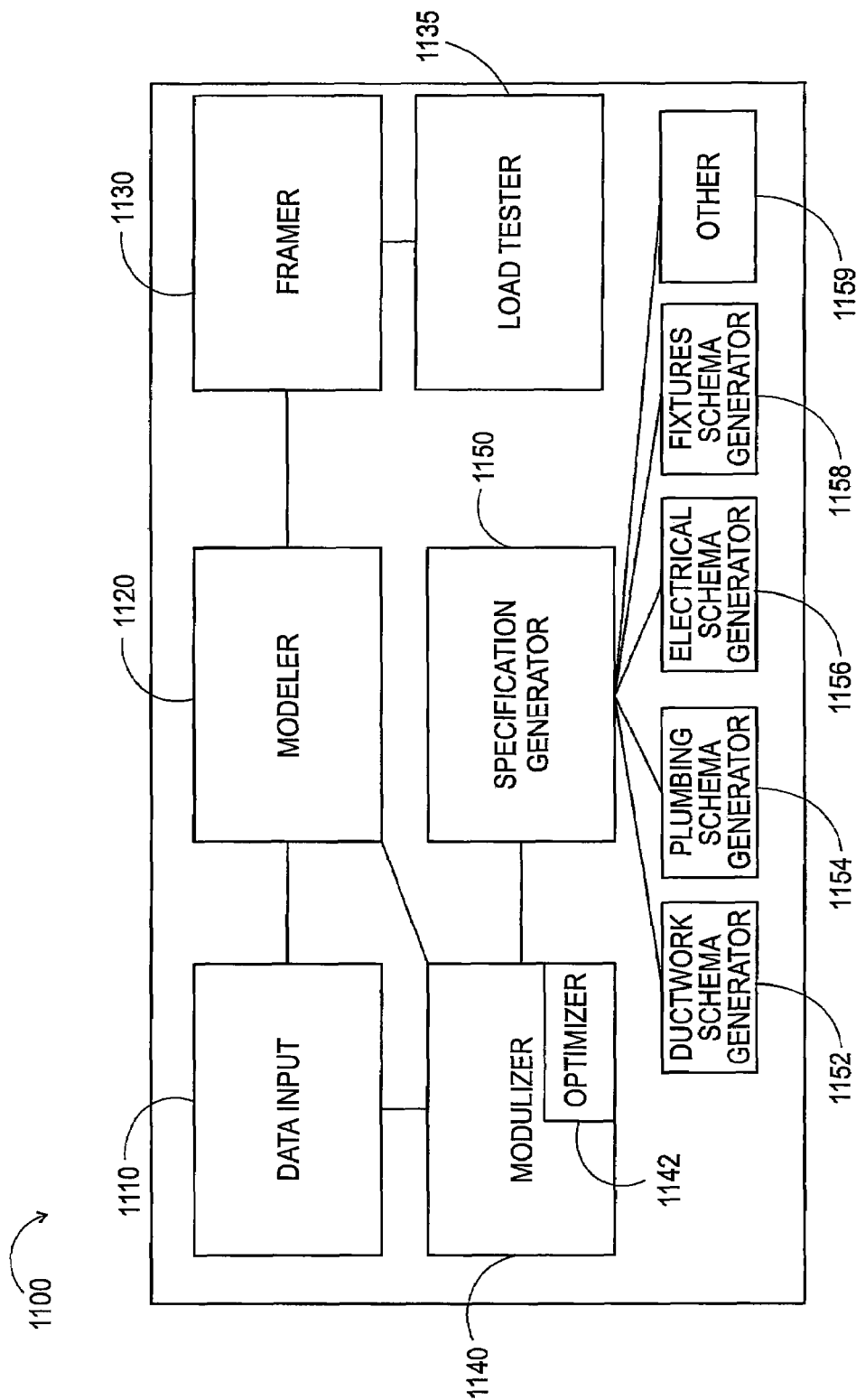
FIG. 2b is a diagram of the design system of a preferred embodiment of the present invention.

Turning to FIG. 2b, an implementation of the Design System 1100 is shown. In addition to a user interface, as described above, the Design System 1100, further includes a data input 1110 to receive the user specifications and/or design for a building, which define the details of the building, including the shape, dimensions, and components of the building, including the floors, walls, windows and openings. The user specification and/or design may further provide the details for plumbing, electricity, finishes, materials, and fixtures, such as cabinets, closets, and lighting. The user specification and/or design may be in the form of text and/or a graphical model, preferably a 3D model generated by a CAD program compatible with the AutoCAD® and Architectural DeskTop ("ADT") environments. In a preferred embodiment, the Design System 1100 receives the user specification from the Configuration Client 1050, shown in FIG. 1, in the form of an user selection sheet 1056, described above. The Design System 1100 preferably includes a modeler 1120, which may generate a model of the design, preferably a 3D model, based on the user's specification, which may be reviewed by the user, by means of the User Interface 1054 of the Configuration Client 1050. In one implementation, the modeler 1120 will access and utilize an user selection sheet 1056 and the appropriate building specification file 1215 from the building model database 1210 to generate a 3D model. The modeler 1120 may operate within the AutoCAD®/ADT environment and use programs and standards for structuring 3D modeling of building components, e.g., windows, plumbing, material, such as those provided by modules of the hsbCAD™ design tool. For standard units of measurement, the metric system is preferably adopted.

The Design System 1100 further includes a framer 1130, which generates the construction details for the design, such as the framing requirements and the components of the building. For example, the framer 1130 may generate details for the roof, plumbing, electrical, ductwork, i.e., heating, ventilating, and air conditioning ("HVAC"), and fixtures, such as cabinets and lighting. Preferably, the framer 1130 operates within the 3D modeling environment described above, e.g., AutoCAD®/ADT. The framer 1130 further may include and/or utilize hsbFrame™, an hsbCAD™ module, compatible with the AutoCAD®/ADT environment, that automates wood framing and detailing as well as light steel. In addition to wood framing and light steel framing, the framer 1130 may generate construction details for steel framing.

As can be appreciated by one of ordinary skill in the art, details of the framing of the roof structure and walls may be generated based on approximated dead and live structural loads in accordance with government codes and information provided by the load tester 1135, described below.

As can be appreciated by one of ordinary skill in the art, the Design System 1100 further includes a load tester 1135, which simulates the structural soundness of the details generated by the framer 1130. The load tester 1135 may include an option that allows a user to select a site upon which the desired building is intended to be assembled. The site may include geographical information, such as the city of the site, as well as geological information, such as type of foundation, e.g., type of ground. With the geographical information, such as the local city, the system 1100 may retrieve appropriate municipal codes that specify structure requirements. From this information, as one of ordinary skill in the art may appreciate, the load tester 1135 may apply a computer simulated load to the structural details of the design and determine the structural soundness of the design. If the simulated test fails, then the user may be prompted to correct any inadequacies in the design.

In one implementation, databases of government building codes requirements are acquired from third-party inspection agencies, such as TR Arnold. The data is stored in a database application, such as Microsoft's Access™. An interface for the display and access of the local information from within AutoCAD® may be developed using Visual Basic™. Finite Element Analysis (FEA) software known in the art may be used for structural testing of computer models. Many FEA programs are capable of importing "DXF" files generated by AutoCAD®. As can be appreciated by one of ordinary skill in the art, VBA scripts and macros may be developed to manage the DXF files and FEA program(s).

The Design System 1100 further includes a modulizer 1140, which subdivides the design of the building into modules and elements of a size suitable for manufacturing and shipment. For example, in accordance with the Department of Transportation, the maximum size for a load on a truck on a public road is approximately sixty feet long, fifteen feet wide, and sixteen feet high, wherein the height is measured from the ground to the top of the load when placed on the truck. The modulizer 1140 reverse engineers the design into appropriate sized modules. Thus, the modulizer 1140 allows for designs to be created without having to take shipment issues into account, which allows for more home designs.

Currently, reverse engineering home designs are typically done manually by architects, which may be a tedious process of trial-and-error, wherein the architect separates the design into modules by hand in a drawing or a CAD program. To resolve this issue, the modulizer 1140 of an embodiment of the present invention preferably includes an optimizer 1142, which optimizes the subdivision process. The optimizer 1142 will recursively subdivide the design, varying orientation and size of the subdivided modules and elements to provide absolution with the minimum number of modules and elements for production. This is an example of an optimal solution because by having the minimum number of modules and elements for production, production costs are minimized. In addition, the number of trucks required for shipment may be minimized, thus reducing shipping costs. The subdivision may preferably be performed iteratively, using a genetic algorithm to intelligently vary the subdivision method during each iteration, allowing the optimizer 1142 to search for an optimal solution. A genetic algorithm is known in the art as a rules based algorithm derived from biological aspects of genetics that heuristically reduces iterations of a "brute force" or exhaustive method.

Figure 3A:
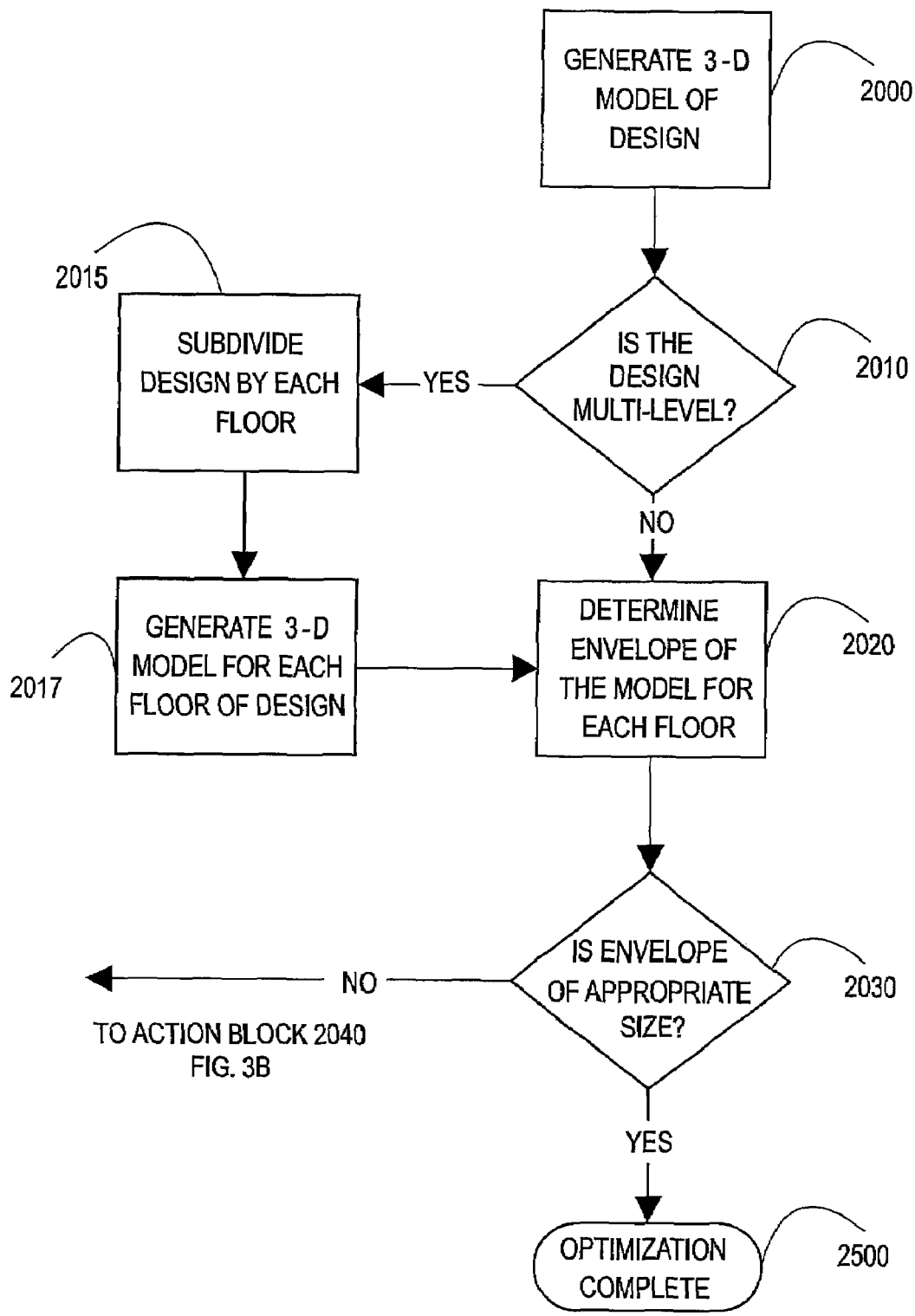
FIGS. 3a-3b is a diagram of an optimization process of a preferred embodiment of the present invention.
Figure 3B:
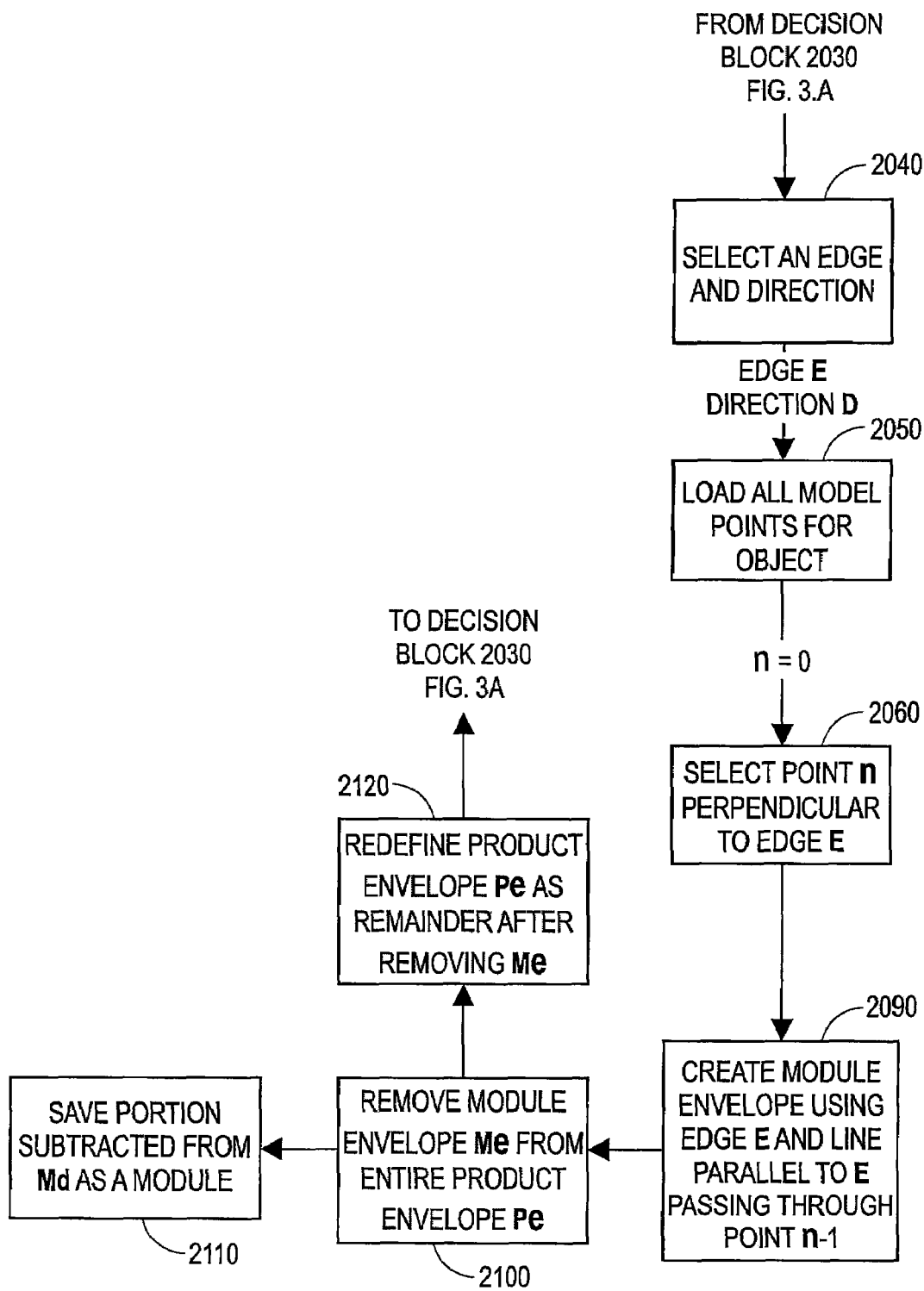
Figure 5A:
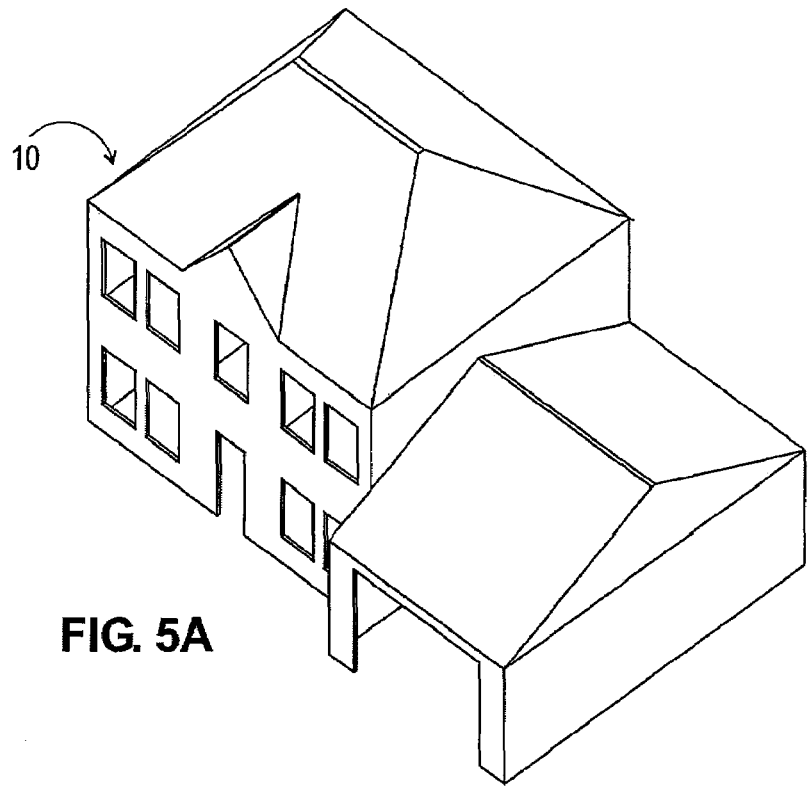
FIGS. 5a-5e are diagrams of 3D models in accordance with a preferred embodiment of the present invention.
Figure 5B:
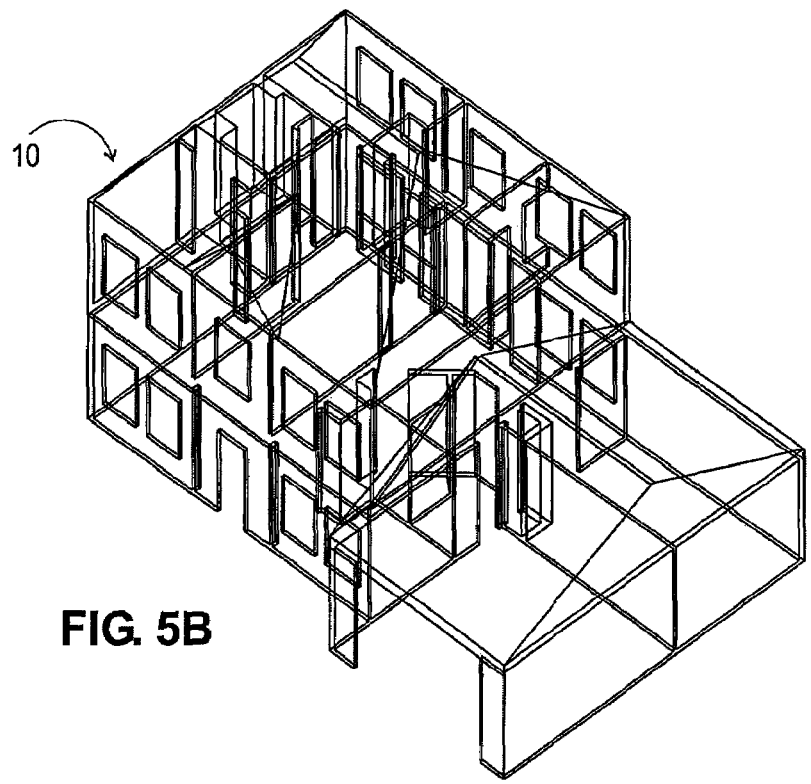
Figure 5C:
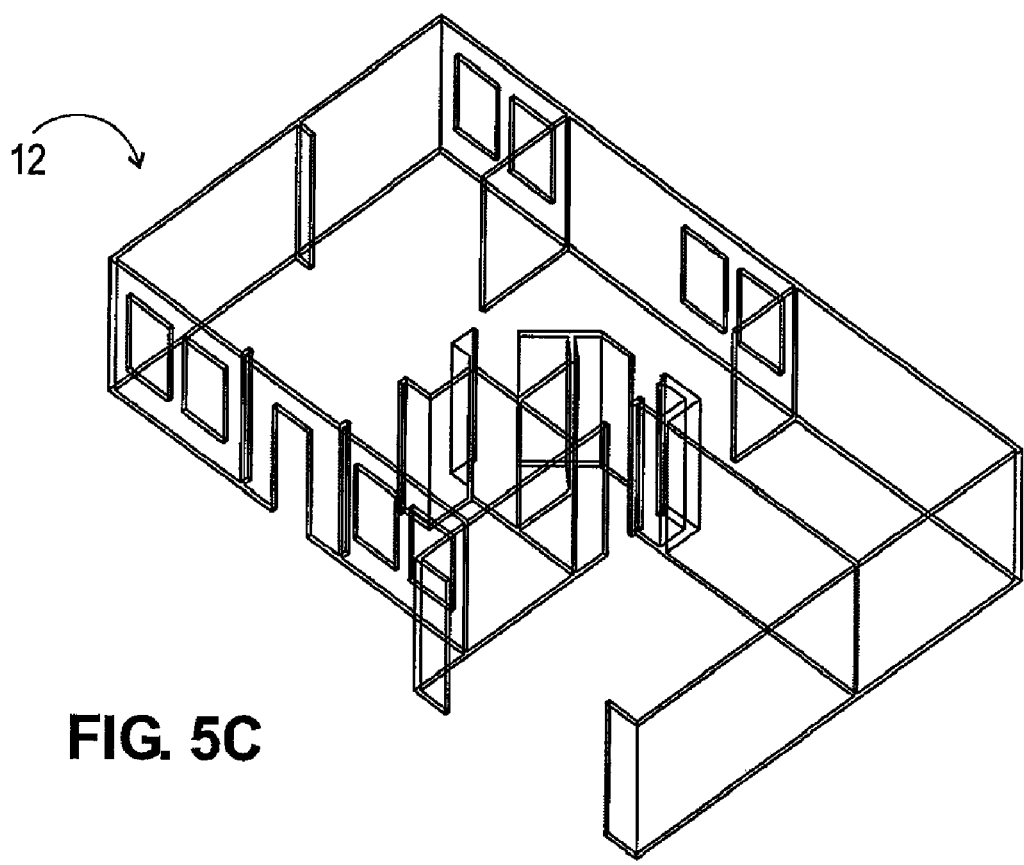
Figure 5D:
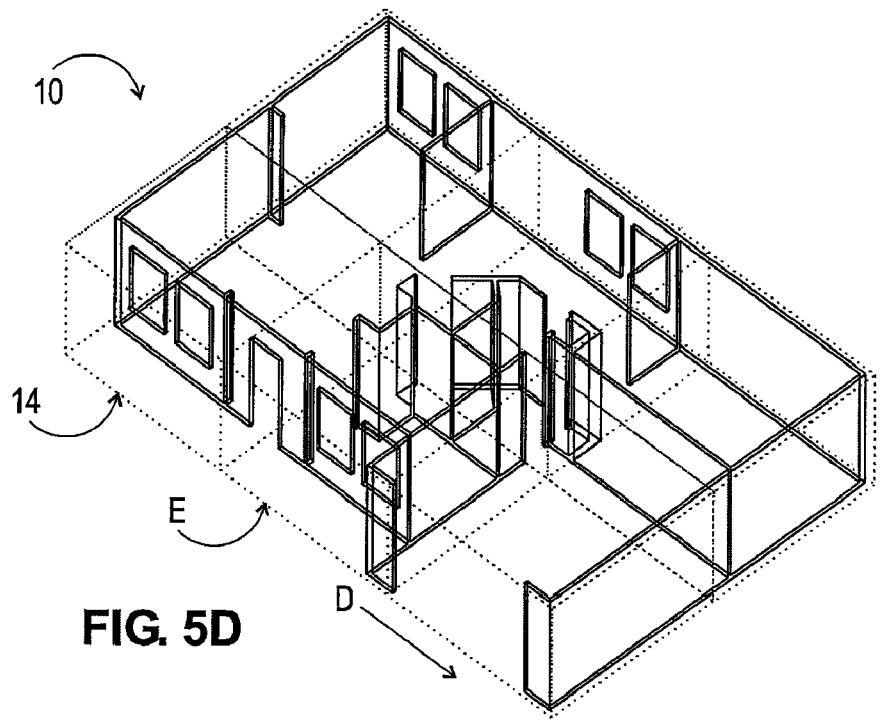
Figure 5E:
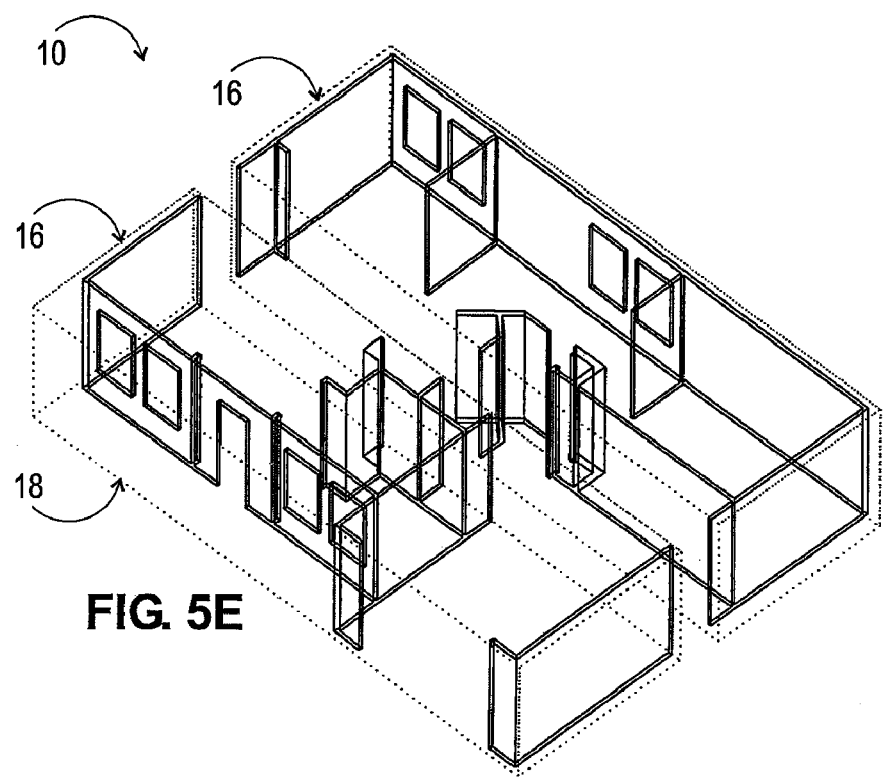

One approach to implementing an optimizer is shown in FIGS. 3*a*-3*b*. Turning to FIG. 3*a*, a 3D model of the design is generated, preferably by the modeler 1120 (action block 2000) (FIGS. 5*a* and 5*b* show an example 3D model 10). The model 10 may be described as an ordered set of points and edges as is known in 3D CAD applications. It is first determined whether the design comprises of multiple floors (decision 2010). If so, then the modulizer 1140 will subdivide the design by each floor 12 (action block 2015), and a 3D model of each floor 12 will be generated (action block 2017) (an example is shown in FIG. 5*c*). Subsequently, the optimizer 1142 will then perform its algorithm on each generated model 10. For each 3D model 10, optimizer 1142 determines the overall envelope 14 of the model 10 (action block 2020). The envelope 14 is the maximum extent of the model 10 in all three dimensions, which will result in a rectangular shape, as shown in FIG. 5*d*. This envelope 14 may be determined by checking every point within the 3D model 10 and recording the maximum and minimum point in each direction. This envelope 14 is used as the boundary for subdividing the model 10 into modules 16 and elements, as shown in FIG. 5*e*.

If the envelope 14 is of appropriate size, i.e., if the size of the envelope 14 is less than the maximum dimensions for shipping a module 16, (decision block 2030), then the optimization process is complete (termination block 2500). If not, then turning to FIG. 3*b*, the model 10 must be subdivided. An edge E of the product envelope is selected, and a direction D for the subdivision process is determined (action block 2040). The direction D is determined by the edge E, as the sub-division is made from the edge E into the mass of the model 10. The selection of the edge E can be done using alternative approaches, including:

(1) The edge E an be selected by a user prior to action block 2040. If an edge is selected by the user, then the sub-division process derives an initial direction based on the edge and modularizes the entire model 10 based on that direction;

(2) The edge E can be selected at random. If the edge is selected randomly, then the direction may be changed with each subdivision, allowing the model 10 to be modularized in more than one direction. When the edge is selected randomly, the optimizer 1142 may produce a variety of results from which the optimal solution may be selected; and (3) As one of ordinary skill in the art may appreciate, the edge E can be selected by a genetic algorithm. The optimizer 1142 may produce a series of results, from which the optimal solution may be selected. The direction and edge information, as well as the method for selecting break points (action block 2060) from the optimal solution, may be slightly varied to produce other results from which a user may select a modularizing solution.

Once the edge E and direction D are selected, all points from within the 3D model 10 may be loaded into the optimizer 1142 (action block 2050). The optimizer 1142 then selects from all the points within the model 10 a break point to define a module envelope 18 (action block 2060). This point can be selected in alternative approaches, including approaches shown in FIGS. 4a-4c.

Figure 4A:
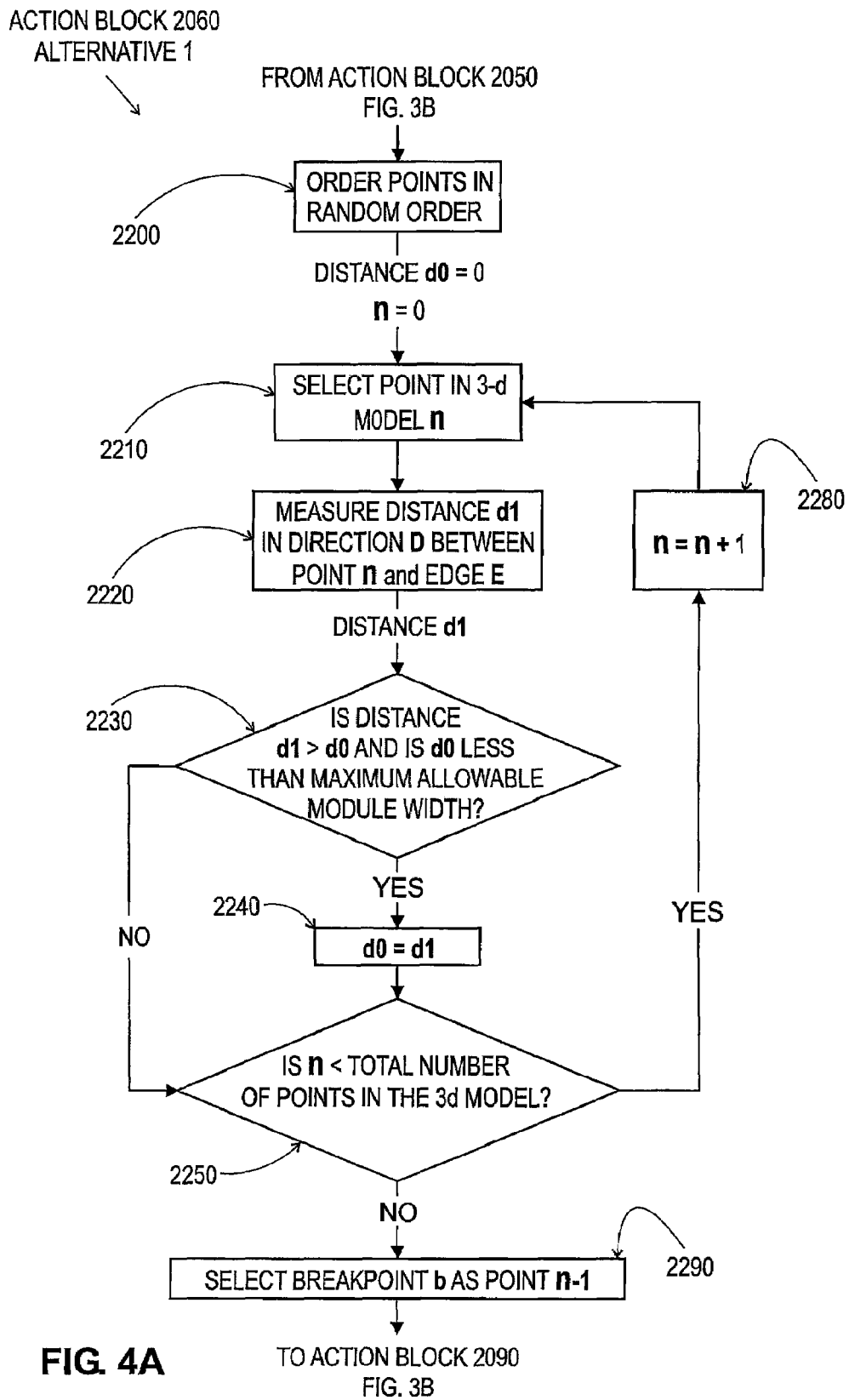
FIGS. 4a-4c are diagrams of alternative processes of a preferred embodiment of the present invention.

Turning to FIG. 4a, an approach to selecting a break point (action block 2060) is shown. The optimizer 1142 orders all the points in a random order (action block 2200), and iteratively selects each point (action block 2210) in order to test the points' distance d1 from the edge E (action block 2220). As the optimizer 1142 checks each point, it finds the one furthest from the edge E yet within the maximum limits allowable as a module 16 for shipment (decision block 2230). This point is used as the breakpoint (action block 2290). If the point evaluated does not meet this criteria, then the next point is checked (decision block 2250, action block 2280).

Figure 4B:
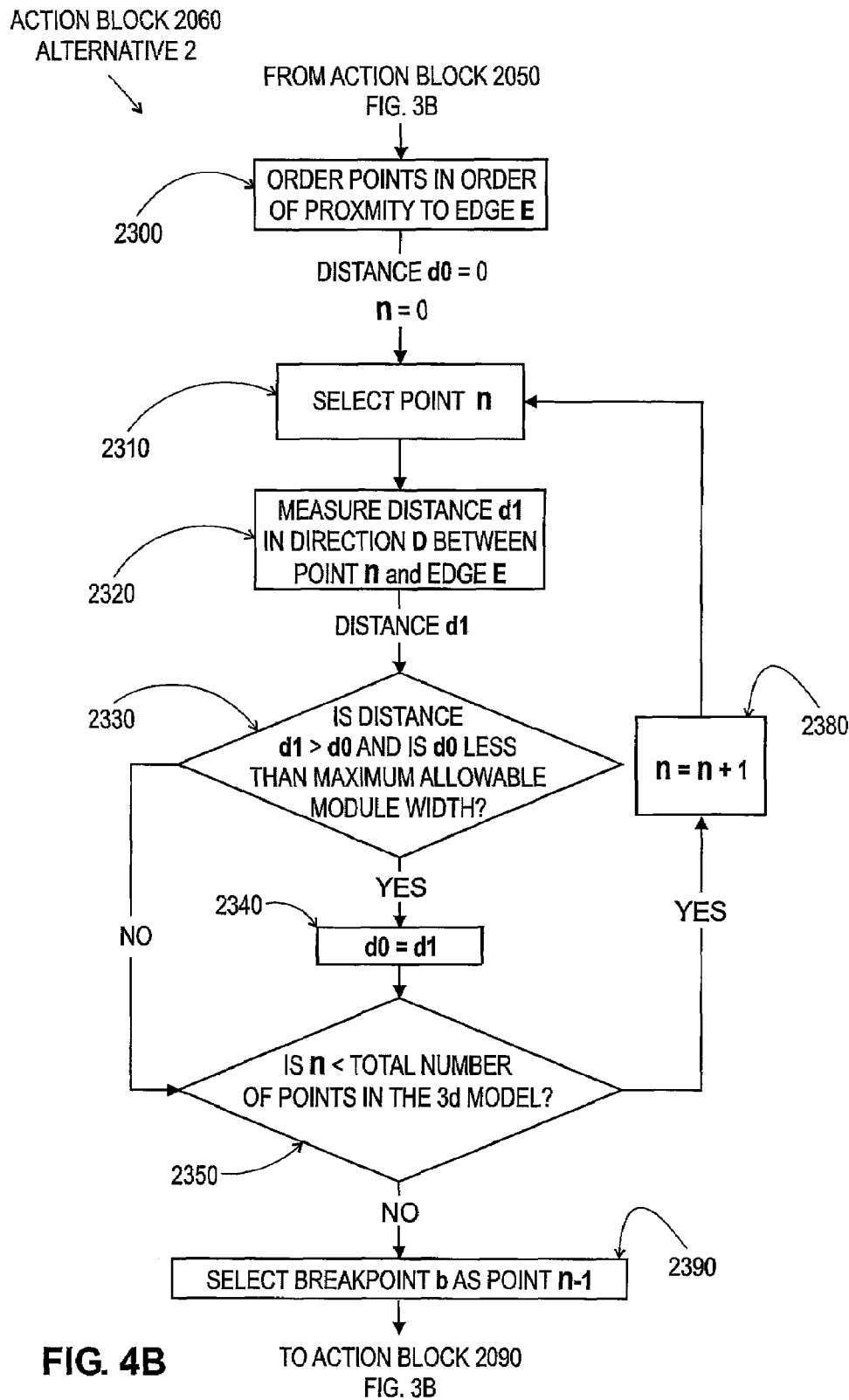

Turning to FIG. 4b, an alternative approach to selecting a break point (action block 2060) is shown. The optimizer 1142 orders all the points based on proximity to the initial edge E (action block 2300) and iteratively selects each point (action block 2310) in order to test the point's distance d1 from the edge E (action block 2320). As the optimizer 1142 checks each point, it finds the one furthest from the edge E yet within the maximum limits allowable as a module 16 for shipment (decision block 2330). This point is used as the breakpoint (action block 2390). If the point evaluated does not meet this criteria, then the next point is checked (decision block 2350, action block 2380).

Figure 4C:
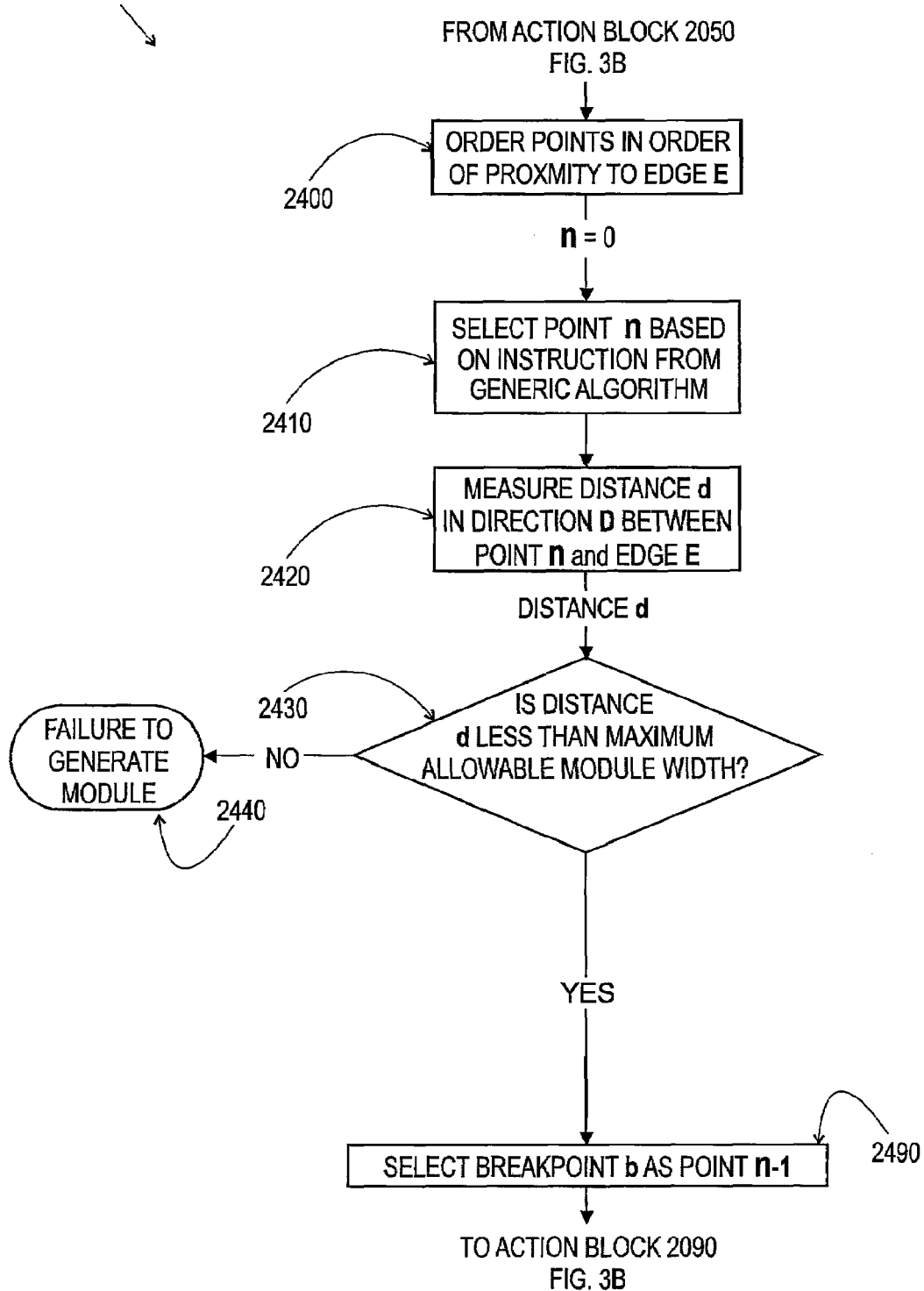

Turning to FIG. 4c, another alternative approach to selecting a break point (action block 2060) is shown. The optimizer 1142 orders all points based on based on proximity to the initial edge E (action block 2400), and selects a point n based on instructions from a genetic algorithm (action block 2410). The distance from the point n is measured from the edge E (action block 2420). If the distance is larger than the maximum allowable length as a module 16 for shipment (decision block 2430), then the optimizer 1142 will stop processing (termination block 2440). If the distances is less, then the point n will be used for the breakpoint b (action block 2490).

Once the break point b is selected (action block 2060), then it is used to establish an envelope for the module 16. The module envelope 18 is a 3D rectangle with edge E and a parallel edge through the selected breakpoint b (action block 2090). This envelope 18 is subtracted from the product envelope 14 and the 3D model 10 (action block 2100). The remainder of the 3D model 10 is then used to as a new product envelope 14 and 3D model 10 (action block 2120). The portion of the 3D model 10 that was subtracted and contained within the module envelope 18 is then stored as a subdivided module 16 by the modulizer 1140 (action block 2110). Action blocks 2040 to 2120 are repeated until the remaining product envelope 14 and 3D model 10 are within the maximum allowable size as module 16 for shipment.

The entire process may be executed repeatedly with all the results collected. After a fixed number of iterations, the iteration with the least number of modules may be selected as the optimal modulization solution. In one implementation, the algorithm described above may be developed as a plug in for AutoCAD®/ADT using C++ or Visual Basic™.

Turning back to FIG. 2b, the Design System 1100 further includes a specification generator 1150 that generates the details, preferably in the form of a data file or a database record, which herein may be referred to as the "building specification file" 1215 (see FIG. 6), for implementation of the design. The details include the geometry of the design, including window and door opening position and sizes. The details also include allowable fixtures for plumbing and electricity and finishes for each surface, e.g., wall, floor, and ceiling. As mentioned above, the building specification file 1215 may be read by the 3D modeling software to generate a full 3D model of the design for architectural review and generation of CNC code. The building specification file 1215 is stored in the building model database 1210 of the building model manager 1200 shown in FIG. 6. In one implementation, the building specification file 1215 utilizes an existing format developed by hsbCAD that stores a comprehensive description of a building, including options, using an AutoCAD® file and an additional proprietary data file.

After a plurality of modules 16 (see FIG. 5e) have been created by the modulizer 1140, an inventory of connectors for the plumbing, electricity, fixtures and ductwork that span across the plurality of modules 16 need to be generated. The specification generator 1150 may generate schemas for fabrication details, including, e.g., ductwork 1152, plumbing 1154, electrical 1156, and fixtures 1158, which include the connector information. Others 1159 may be included as well. The ductwork 1152 schema includes an inventory of ducts and diffusers for instructions for the manufacture. A cut-sheet of duct sizes and lengths may be generated for instructions, such as CNC code, for manufacture. The plumbing schema 1154 may include an inventory of plumbing parts and pipe lengths for instructions, such as CNC code, for manufacture. The electrical schema 1156 may include an inventory of electrical outlets and switches, conduit lengths and joints, and a total wire length for instructions for manufacture. The individual lengths of wire may also be calculated and recorded in a cut-sheet for instructions for manufacture. In one implementation, the specification generator 1150 may be developed as plug-ins for AutoCAD®/ADT, using C++ or Visual Basic™. The components generated within the specification generator 1150 may be labeled with a part number within the MRP 1350, described below and shown in FIG. 7.

Figure 6:
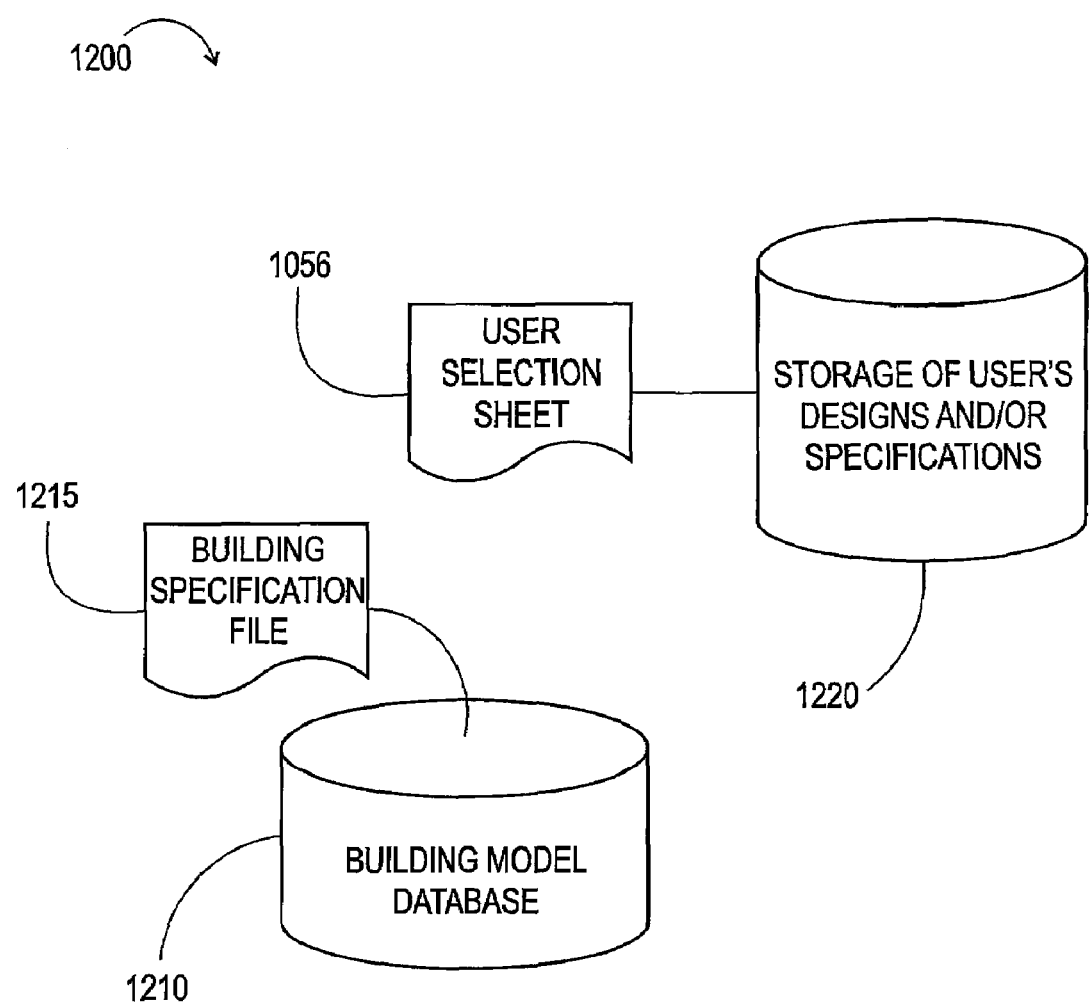
FIG. 6 is a diagram of a building model manager in accordance with a preferred embodiment of the present invention.

Turning to FIG. 6, an implementation of a building model manager 1200 is shown. The building model manager 1200 includes a building model database 1210 and a database 1220 that stores the users' option sheets 1056. The building model database 1210 includes the building specifications files generated by specification generator 1150 of the Design System 1100, and provides the necessary data for the moduler 1120 and/or the User Interface 1054 to construct a 3D model. The building specification file 1215 further provides the information for the generation of CNC code.

In one implementation, the building model database 1210 and the database 1220 that stores the option sheets 1056 may be implemented using standard database methods and systems, such as Microsoft's Access™. As described above, the building specification file 1215 utilizes an existing format developed by hsbCAD that stores a comprehensive description of a building, including options, using an AutoCAD™ file and an additional proprietary data file. Because these files may be several megabytes in size, standard compression systems are preferably used when sending these files over a network. An user selection sheet 1056 implementation is based on the existing file format used by Systemacasa™, and is preferably Extensible Markup Language ("XML") based.

Turning to FIG. 7, an implementation of a manufacturing system 1300 is shown. The manufacturing system 1300 includes manufacturing resource planning ("MRP") and supply chain management ("SCM") 1350 components. These components manage the material inventory for the building components, and are accessible by the Design System 1100 to verify inventory and costs and are accessible by the User Interface 1054 to provide cost and inventory information to the user. As mentioned above, the MRP and SCM 1350 may also function as a clearing-building and authorizing agent for all manufacturing operations. In one implementation, software for the MRP and SCM 1350 is implemented using commercially available Enterprise Resource Planning applications, such as Macola™ and SAP™. Such applications may be augmented by using scheduling and production management applications, such as Preactor™, sold by BCT. Because the MRP and SCM 1350 communicate with components operating within a 3D environment, such as AutoCAD®/ADT, it is preferable to utilize programs that allow these components to communicate with each other. In one preferred embodiment, products from Aimasoft are used, which allow AutoCAD® based programs to directly communicate with Macola™ programs.

The manufacturing system 1300 further includes an architectural review module 1305 having a user interface. This module will load an user selection sheet 1056 from the database 1220 of users' option sheets 1056 and combine the user selection sheet 1056 with the appropriate building specification file 1215, which may be loaded from the building model database 1210 to create a complete model, preferably a 3D model, of the building design. An architect or engineer may review the design and make adjustments and utilize the tools available in the Design System 1100, such as the framer 1130 or the load tester 1135 (see FIG. 2b) via the user interface of the architectural review module 1305. The architect or engineer may then print a full set of contract documents for filing with local government and for construction purposes. Any changes may require the reallocation of resources within the MRP 1350. In one implementation, the 3D model is generated by hsbCAD and the architectural review module 1305 may be implemented using C++ or VBA, accessing AutoCAD's® Application Programming Interface ("API").

As mentioned above, instructions are generated to manufacture the components of the designed building. The manufacturing system 1300 includes a code generator 1310 that generates the instructions based on the building specification file 1215 from the Design System 1100/building model manager 1200 and information from the MRP and SCM 1350. The code generator 1310 preferably generates CNC code in the form of a data file. In a preferred embodiment, the CNC code is generated and mapped for each machine tool in the manufacturing system 1300. The instructions preferably includes a visual description of where each manufactured part is located within the building design. The visual description may include a series of vector graphic images and/or look-up tables that associate each part with an X-Y coordinate within the one or more images. Commercial CNC code generators may be used in one implementation, e.g., hsbCAD. Some CNC code generators simply generate CNC code from AutoCAD® or from file formats such as IGES or DXF.

The manufacturing system 1300 further includes an identification ("ID") generator 1320, which generates IDs, such as barcodes or Radio Frequency IDs ("RFIDs"), for each of the building elements and components. Preferably, the ID generator 1310 will generate IDs to send to specific machine tools used in the manufacturing system 1300 for printing/producing and labeling. For the case where the machine tool does not produce IDs or for elements such as wiring, where manual cutting is involved, the ID may be sent to an ID generator at the proper location for placement on the element. In the case of barcode IDs, the generator may be a printer. For the case of RFIDs, the generator may be a machine that produces RFID tags.

The manufacturing system 1300 may include a plurality of machine tools and/or an array of assembly lines 1340, each comprising one or more machine tools or workstations and each configured to manufacture one or more components of a building, such as the wood or steel beams, the dry walls, the ducts, etc. These assembly lines 1340 may be controlled by a production manager 1330. The production manager 1330 manages the machine tools within the assembly lines 1340, controls the code, such as CNC code, generated by the code generator 1310, and releases the code to the appropriate machine tools. The production manager 1330 is configured to receive any number of different sets of instructions, e.g., different CNC code files, and essentially functions as a programmable logic controller, capable of providing instructions for the manufacture of components, modules, and elements for a plurality of building designs, based on the information provided by the Design System 1100 and the building model manager 1200. Preferably, the production manager 1330 communicates with the MRP 1350 to coordinate scheduling and resources.

The manufacturing system 1300 further includes a manufacturing optimizer 1345, which will optimize the arrangement of the components for a building to minimize cutting time and material. For example, the optimizer 1345 may optimize the arrangement of pieces of carpet onto a strip of standard width carpet roll. During this step, individual wall elements may be combined into a single wall piece to optimize the handling of the material.

In the case where barcode is used, the manufacturing system 1300 further includes scanners, such as hand scanners (not shown), used by workers to scan building elements and parts to call up its description and assembly instructions. The manufacturing system 1300 further includes an ID proxy server 1360, such as a barcode proxy server, which provides a communication bridge between the hand-scanners (not shown) and the MRP 1350 to update status of the inventory and completion status of modules. The ID proxy server 1360 may also communicate with the production manager 1330 to request information about part locations within a building module or element. The ID proxy server 1360 may also be accessible over the Internet, allowing off-site users, such as building contractors assembling the building, to use similar scanning devices to scan the components on the construction site and request information and diagrams assisting in building assembly. In one implementation, Scanco barcode products are utilized. In the case where RFID is used, the appropriate RFID equipment is utilized to identify parts and location, and the ID proxy server 1360 supports RFID technology.

One advantage of the system 1000 is that the system 1000 is capable of building prefabricated components for custom building designs without having to significantly modify the assembly lines or the layout of the assembly lines. A custom design for a building may be entered into the Design System 1100, the Design System 1100 will enter the details of the design into the manufacturing system 1300 to build the appropriate components for assembly in accordance with the design.

Thus, a consumer interested in investing in a prefabricated home may select a custom design, as opposed to limited choices provided by the manufacturer, yet still maintain the economic benefits of investing in a prefabricated building.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention can be performed using different or additional process actions, or a different combination or ordering of process actions. For example, this invention is particularly suited for applications involving prefabricated building, but can be used on any design involving prefabricated structures in general. As a further example, each feature of one embodiment can be mixed and matched with other features shown in other embodiments. Additionally and obviously, features may be added or subtracted as desired. Accordingly, the invention is not to be restricted except in light of the attached claims and their equivalents.

What is claimed is:

1. A system for manufacturing a customized prefabricated building comprising:
   a computer-usable medium having a sequence of instructions which, when executed by a processor, causes said processor to execute a process including receiving a specification for a customized building that identifies components for the building and the dimensions of the components, modularizing the specification for prefabrication into modules meeting overall length, width, and height limitations, and optimizing the modularization;
   a programmable manufacturing system controller coupled to the computer-usable medium and configured to generate instructions for manufacturing the said optimized modules having the plurality of components identified in the specification received by the computer-usable medium; and
   a set of assembly line machine tools coupled to the programmable manufacturing controller configured to execute the instructions generated by the programmable manufacturing controller for building the said optimized modules having the specified plurality of components;
   wherein modularizing the specification comprises arbitrarily modularizing to meet the length, width and height limitations, without using any pre-defined modules.

2. The system of claim 1, wherein the optimizing the modularization within the process further includes:
   generating a 3D model based on the specification;
   subdividing the model by each floor if multiple floors exist into modules; and
   modularizing each floor such that a minimum number of modules are created.

3. The system of claim 2, wherein the modularization of each floor includes establishing one or more break points.

4. The system of claim 1, wherein the optimizing the modularization within the process further includes a genetic algorithm.

5. The system of claim 1, wherein the optimizing the modularization within the process is an intelligent iterative process.

6. The system of claim 1, further comprising a user interface coupled with the system configured to allow a user to create the specification.

7. The system of claim 6, wherein the user interface provides the user with an option to establish a design for the customized prefabricated building.

8. The system of claim 7, wherein the design for the customized prefabricated building includes a geometric shape for the customized prefabricated building.

9. The system of claim 6, wherein the user interface includes a program visually rendering a 3D model.

10. The system of claim 6, wherein the user interface is web-based.

11. The system of claim 1, wherein the set of assembly line machine tools support CNC code.

12. The system of claim 11, wherein the set of assembly line machine tools are arranged in a programmable array.

13. The system of claim 1, wherein the building is a residential house.

14. The system of claim 1, wherein the building is a commercial structure.

15. The system of claim 1, wherein the process further includes load testing the specification.

16. The system of claim 1, wherein the process further includes generating a 3D model based on the specification.

17. The system of claim 1, wherein the overall length, width, and height limitations are subject to an envelope that is approximately sixty feet long, fifteen feet wide, and sixteen feet high, wherein the height is measured from the ground to the top of the envelope when placed on a truck.

18. The system of claim 1, further comprising a manufacturing resource system coupled to the programmable manufacturing system controller and configured to manage inventory of components for construction of the modules.

19. The system of claim 1, wherein the process further includes generating framing details for the specification.

20. The system of claim 1, wherein the instructions are CNC code.

21. A method for manufacturing a plurality of custom prefabricated buildings comprising the steps of:
   providing a graphical user interface that allows a plurality of users to each create a custom design for a prefabricated building, wherein one design created by one user is different from another design created by another user;
   generating a specification for each custom design created by the plurality of users that identifies components for the prefabricated building in the custom design and the dimensions of the components;
   modularizing each specification into modules meeting overall length, width, and height limitations;
   optimizing the modularization;
   generating a set of instructions for each module of each specification, wherein each set of instructions includes instructions specific for each of a plurality of machine tools required for manufacturing the modules;
   inputting the generated instructions into a controller that controls the plurality of machine tools and distributes the instructions to the corresponding machine tool;
   manufacturing each module utilizing the plurality of machine tools; and
   packaging each module for shipment to a site upon which a custom prefabricated building is to be built;

wherein modularizing the specification comprises arbitrarily modularizing to meet the length, width and height limitations, without using any pre-defined modules.

22. The method of claim 21, further comprising the step of:
returning to each user an approximate cost for the manufacture of the custom prefabricated building shortly after the user creates its design.

23. The method of claim 21, wherein the optimization step includes the steps of:
generating a 3D model based on each specification;
subdividing the model by each floor if multiple floors exist into modules; and
modularizing each floor such that a minimum number of modules are created.

24. The method of claim 21, wherein the optimization step includes a genetic algorithm.

25. The method of claim 21, wherein the optimization step includes an intelligent iterative process.

26. The method of claim 21, further comprising the step of:
managing an inventory of components necessary for constructing the modules.

27. The method of claim 21, wherein the instructions specific for each of a plurality of machine tools required for manufacturing the modules include CNC data.

28. The method of claim 21, wherein the generation of the specification comprises the step of:
generating a plumbing schema;
generating a ductwork schema;
generating an electrical schema; and
generating a fixtures schema.

29. The method of claim 21, wherein the generation of the specification further comprises the step of:
generating framing details for the custom prefabricated building.

30. The method of claim 21, further comprising the step of: testing the load of each specification.

31. The method of claim 21, further comprising the step of:
generating a 3D model for each specification.

32. A system for manufacturing a customized prefabricated building comprising:
a computer-usable medium having a sequence of instructions which, when executed by a processor, causes said processor to execute a process including receiving a specification for a customized building that identifies components for the building and the dimensions of the components, modularizing the specification for prefabrication into modules meeting overall length, width, and height limitations, and optimizing the modularization;
a programmable manufacturing system controller coupled to the computer-usable medium and configured to generate instructions for manufacturing the said optimized modules having the plurality of components identified in the specification received by the computer-usable medium; and
a set of assembly line machine tools coupled to the programmable manufacturing controller configured to execute the instructions generated by the programmable manufacturing controller for building the said optimized modules having the specified plurality of components;
wherein optimizing the modularization comprises:
determining a specification envelope of the specification, the specification envelope having a plurality of edges;
selecting an edge of the plurality of edges;
selecting a direction based on the edge;
selecting a break point to define a module envelope, wherein the break point meets the overall length, width and height limitations;
subtracting the module envelope from the specification envelope to create a remaining specification envelope, and
repeating the optimization on the remaining specification envelope.

33. The system of claim 32, wherein selecting the break point comprises
ordering a plurality of points within the specification envelope in a random order,
iteratively selecting each point to test the point's distance from the edge,
identifying as the break point the point furthest from the edge yet within the overall length, width and height limitations.

34. The system of claim 32, wherein selecting the break point comprises
ordering a plurality of points within the specification envelope in a distance order from the edge,
selecting a point based on a genetic algorithm;
testing a distance between the selected point and the edge, and
identifying the selected point as the break point if the distance is within the overall length, width and height limitations.

35. The system of claim 32, wherein selecting the break point comprises
ordering a plurality of points within the specification envelope in a distance order from the edge,
iteratively selecting each point to test the point's distance from the edge,
identifying as the break point the point furthest from the edge yet within the overall length, width and height limitations.

36. The system of claim 32, wherein modularizing the specification comprises arbitrarily modularizing to meet the length, width and height limitations, without using any pre-defined modules.

37. A method for manufacturing a plurality of custom prefabricated buildings comprising the steps of:
providing a graphical user interface that allows a plurality of users to each create a custom design for a prefabricated building, wherein one design created by one user is different from another design created by another user;
generating a specification for each custom design created by the plurality of users that identifies components for the prefabricated building in the custom design and the dimensions of the components;
modularizing each specification into modules meeting overall length, width, and height limitations;
optimizing the modularization;
generating a set of instructions for each module of each specification, wherein each set of instructions includes instructions specific for each of a plurality of machine tools required for manufacturing the modules;
inputting the generated instructions into a controller that controls the plurality of machine tools and distributes the instructions to the corresponding machine tool;
manufacturing each module utilizing the plurality of machine tools; and
packaging each module for shipment to a site upon which a custom prefabricated building is to be built;

wherein optimizing the modularization comprises:

determining a specification envelope of the specification, the specification envelope having a plurality of edges;

selecting an edge of the plurality of edges;

selecting a direction based on the edge;

selecting a break point to define a module envelope, wherein the break point meets the overall length, width and height limitations subtracting the module envelope from the specification envelope to create a remaining specification envelope, and repeating the optimization on the remaining specification envelope.

38. The method of claim 37, wherein selecting the break point comprises ordering a plurality of points within the specification envelope in a random order, iteratively selecting each point to test the point's distance from the edge, identifying as the break point the point furthest from the edge yet within the overall length, width and height limitations.

39. The method of claim 37, wherein selecting the break point comprises ordering a plurality of points within the specification envelope in a distance order from the edge, selecting a point based on a genetic algorithm;

testing a distance between the selected point and the edge, and identifying the selected point as the break point if the distance is within the overall length, width and height limitations.

40. The method of claim 37, wherein selecting the break point comprises ordering a plurality of points within the specification envelope in a distance order from the edge, iteratively selecting each point to test the point's distance from the edge, identifying as the break point the point furthest from the edge yet within the overall length, width and height limitations.

41. The method of claim 37, wherein modularizing the specification comprises arbitrarily modularizing to meet the length, width and height limitations, without using any pre-defined modules.

* * * * *